Aug. 21, 1951 .G. HOHWART ET AL 2,565,430
DIAPHRAGM CHUCK
Filed Jan. 3, 1947 2 Sheets-Sheet 1

INVENTORS.
George Hohwart,
Ernest F. Hohwart.
BY
Harness, Dickey & Pierce
ATTORNEYS.

Aug. 21, 1951         G. HOHWART ET AL         2,565,430
                        DIAPHRAGM CHUCK
Filed Jan. 3, 1947                          2 Sheets-Sheet 2

INVENTORS.
George Hohwart,
Ernest F. Hohwart,
BY
Harness, Dickey & Pierce.
ATTORNEYS.

Patented Aug. 21, 1951

2,565,430

UNITED STATES PATENT OFFICE 2,565,430

DIAPHRAGM CHUCK

George Hohwart and Ernest F. Hohwart, Detroit, Mich., assignors to N. A. Woodworth Company, Ferndale, Mich., a corporation of Michigan Application January 3, 1947, Serial No. 719,964

26 Claims. (Cl. 279—46)

This invention relates to chucks of the diaphragm type, and particularly to chucks of this type that are particularly adaptable for chucking gears, the principal object being the provision of a chuck of this type of new and improved construction.

Objects of the invention include the provision of a diaphragm chuck having jaws of a type adapted to engage between the teeth of the gear at approximately the pitch line thereof, such jaws including pins adapted for direct engagement with the gear and yieldable under the chucking pressure to compensate for small irregularities between the teeth of the gear, between the various jaws of the chuck, or present for some other reason; the provision of the chuck of the type described in which the jaws are provided with gear engaging pins and the latter are formed to yield in a direction perpendicular to their length to compensate for irregularities in the desired mating engagement between the pins and the gear to be chucked; and the provision of a construction as above described in which the gear engaging ends of the pins are transversely yieldable in more than one direction to compensate for such irregularities.

Other objects of the invention include the provision of a diaphragm chuck having air operated means for moving the jaws to work-releasing position together with means for discharging air through the bore of the chuck to blow out chips or other foreign material that may find its way to such bore and/or to the jaws of the chuck; the provision of means as above described in which the jet of air for cleaning out the bore of the chuck is automatically operative when the carriage of the associated machine tool is moved to work-loading and/or unloading position; and the provision of a chuck of the type described in which the control of the air to the jaw operating mechanism and the flow of air to the bore blowing out mechanism are independently controlled.

Further objects of the invention include the provision of a diaphragm chuck adapted to chuck gear clusters; the provision of a diaphragm chuck having a plurality of axially spaced diaphragms each of which is equipped with its own set of jaws, one of which is arranged to chuck one gear of a gear cluster and the other of which is arranged to chuck another gear of a gear cluster; the provision of a chuck of the type described which is adapted to chuck gears of the straight spur gear type, gears of the spiral gear or herringbone type and/or gear clusters having gears combining any two or more of these types; the provision of a chuck of the type described in which the jaws for one of the diaphragms are bodily rotatably shiftable about the axis of the chuck and relative to the jaws of the other diaphragm, thereby to enable gear clusters having a pair of gears thereof adapted to be engaged by the jaws of the chuck and which gears have different numbers of teeth, to be inserted into the chuck without regard to rotational position of the gear cluster with respect to the chuck; the provision of a diaphragm chuck as above described in which the last-mentioned feature is accomplished by mounting the gear engaging elements for one of the diaphragms for relative rotation with respect to such diaphragm about the axis of the chuck; the provision of a chuck as last described in which the gear engaging pins of the chuck jaws are so arranged with respect to each other axially of the chuck as to facilitate the insertion of the gear cluster into the chuck; and the provision of a chuck as broadly described in this paragraph in which the rotatably shiftable gear engaging elements are mounted for shifting in a novel manner.

The above being among the objects of the present invention the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views.

Figs. 6, 7 and 8 are front, side, and end views, respectively, of a modified form of gear engaging pin element;

Figs. 9, 10, and 11 are views similar to Figs. 6, 7 and 8, respectively, illustrating a modified form of gear-engaging pin element; and, Figs. 10, 11 and 12 are views corresponding to Figs. 4, 5 and 6, respectively, illustrating a still further form of gear-engaging pin element.

From the following, it will be appreciated that the gear-engaging pin elements hereinafter shown and described are capable of being employed in conjunction with a multiple diaphragm chuck such as shown in the accompanying drawings, or in a single diaphragm chuck, and this regardless of the construction of the chuck itself. The application of these pin-engaging elements is therefore shown by way of illustration and not by limitation in the accompanying drawings. Likewise, the mechanism herein shown and described for controlling the flow of air to the diaphragm operating mechanism of the chuck and for introducing a flow of air into the bore of the chuck for removing chips or other foreign material from such bore and the associated jaws, is capable of use either in the multiple diaphragm chuck of the type described or a single diaphragm chuck, and disclosure thereof in combination with a multiple diaphragm chuck is therefore to be understood to be by way of explanation and not by limitation.

The most important feature of the chuck construction shown in the accompanying drawings is, however, the use of multiple diaphragms and jaw mechanisms actuated thereby in such a manner as to permit certain types of work, of which gear clusters are examples, to be accurately chucked thereby for some desirable operation thereon as, for instance, machining the bore of such cluster in absolute conformity to the pitch diameters of the associated gears thereof. It has particular relation to such a construction enabling gear clusters having gears of different diameters and different numbers of teeth to be quickly and accurately chucked through these gears themselves, and particularly to a construction in which no care need be exercised in introducing the gear cluster into the chuck to see that the gear cluster is in a predetermined rotatable position with respect to the chuck. Furthermore, it is such as to permit gear clusters having two gears of different diameters and different numbers of teeth with the teeth of one of the gears disposed at an opposite helix angle to the gears of the other teeth, to be readily, quickly, and accurately chucked through such gears.

Figures 1, 2, 3, 4:
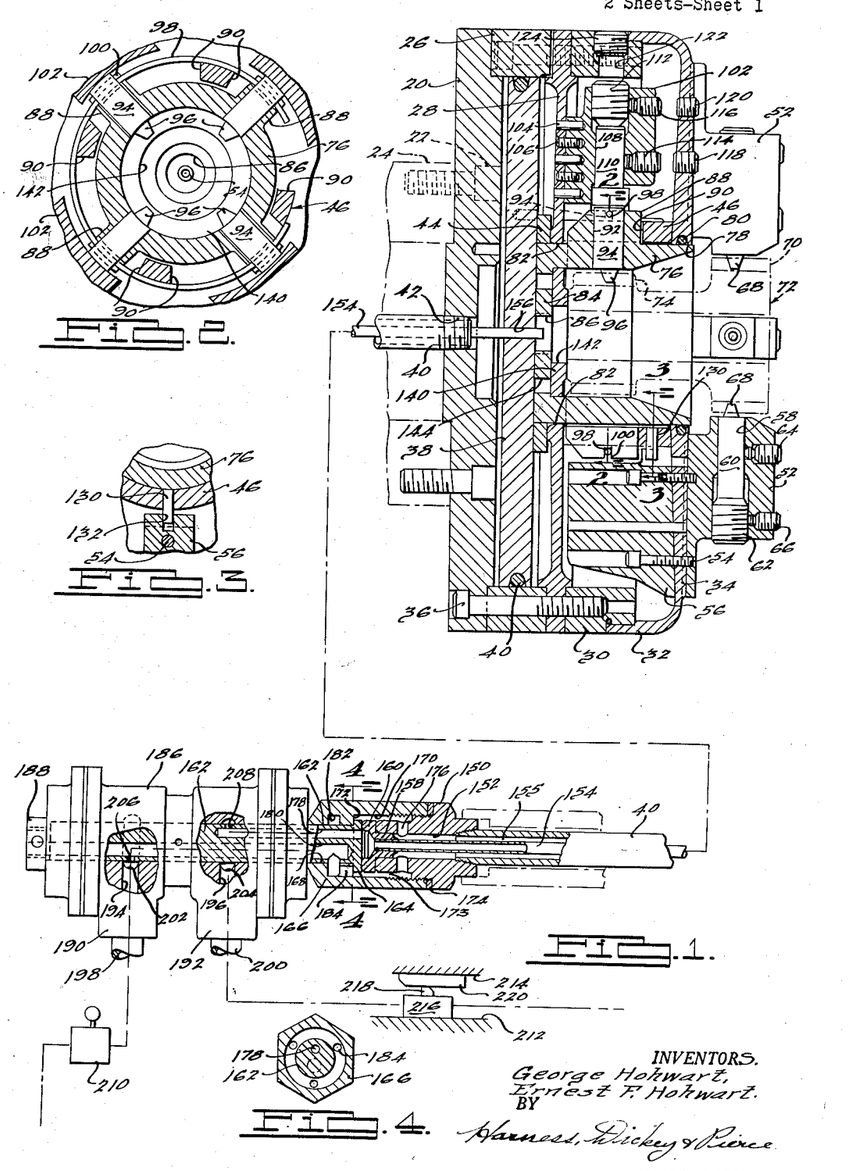
Fig. 1 is a sectional view taken centrally through a diaphragm chuck embodying features of the present invention as on the line 1—1 of Fig. 5, the chuck shown being of the air operated type and illustrating control means for the air and for directing a blast of air to the bore of the chuck.
Fig. 2 is a fragmentary transverse sectional view taken on the line 2—2 of Fig. 1 and illustrating details of the shiftable pin carrier for the inner diaphragm.
Fig. 3 is a fragmentary sectional view taken on the line 3—3 of Fig. 1, showing the means employed for limiting rotation of the pusher member or ring disposed between the two diaphragms.
Fig. 4 is a transverse sectional view taken on line 4—4 of Fig. 1.

Referrinf now to the accompanying drawing, and particularly to Fig. 1, the diaphragm chuck there illustrated includes a circular mounting plate 20 adapted to be concentrically secured by screws such as 22 to the forward end of a rotatable machine tool spindle such as 24 on which it is suitable piloted. The axially outer margin of the mounting plate 20 is stepped and receives in such step in piloted relation thereto a ring member 26 the forward face of which receives in piloted relation with respect thereto an inner diaphragm 28. The axially outer peripheral margin portion of the diaphragm 28 receives thereon in piloted relation with respect thereto a second ring member 30 the axially outer peripheral margin of which is also stepped and receives thereon in piloted relation with respect thereto the axially in-turned rim portion 32 of an outer diaphragm 34 which is thus positioned in substantially parallel and longitudinally spaced relationship with respect to the inner diaphragm 28. The use of the cup-shaped diaphragm forms no part of the present invention, it being disclosed in United States Patent #2,403,599, issued July 9, 1946. The diaphragm 34 is suitably rigidly secured to the ring 30 and while this may be done in any suitable manner it is preferably done by welding or brazing as disclosed and claimed in our copending application for Letters Patent of the United States for Improvements in Diaphragm Chuck filed July 13, 1946 and serially numbered 683,456, now Patent Number 2,492,640, issued December 27, 1949. Screws 36 which project forwardly from the rear face of the mounting plate 20 through such plate 20, ring 26, and diaphragm 28, and thread into the ring 30, serve to maintain all of the aforementioned parts in assembled relation with respect to each other.

The ring 26 provides interiorly thereof a cylinder bore in which a piston 38 is axially reciprocably received, its periphery being sealed to the bore of the ring 26 by means of a conventional O-ring seal 40. Air pressure is adapted to be introduced to the space between the piston 38 and the forward face of the mounting plate 20 through an axially directed pipe or tube 40 the forward end of which is threaded into a complementary threaded central bore 42 in the mounting plate 20. When air pressure is introduced between the forward face of the mounting plate 20 and the rear face of the piston 38 through the tube 40, it tends to move the piston 38 axially outwardly and this force is transmitted to the central portion of the inner diaphragm 28 through a concentric ring 44 interposed between the forward face of the piston 38 and the inner rear edge of the diaphragm 28. This feature broadly forms no part of the present invention but does form part of the subject matter of our copending application for Letter Patent of the United States for Improvements in Diaphragm Chuck, filed July 13, 1946, Serial No. 683,456, now Patent Number 2,492,640, issued December 27, 1949. Such pressure is likewise transmitted to the outer diaphragm 34 through a concentric ring member 46, the axially rear or inner end of which normally lies in substantially abutting relation with respect to the forward face of the piston 38, and the axially outer end of which bears against the inner face of the outer diphragm 34 adjacent the inner margin thereof.

Each diaphragm 28 and 34 respectively may carry three or more jaw assemblies. In the drawings by way of illustration, each is shown as carrying four equally angularly spaced jaw assemblies. In the case of the outer diaphragm 34 each jaw assembly comprises a jaw block member 52 arranged with its thickness generally radially of the axis of the chuck and securely fixed to the outer face thereof. As illustrated in the lower portion of the chuck shown in Fig. 1, the jaw blocks 52 are shown as being secured to the diaphragm 34 by means of screws 54 which project forwardly in axially parallel relation with respect to the axis of the chuck through a corresponding counterweight member 56, through the diaphragm 34, and thread into the jaw blocks 52. The counterweights 56 are blocks or masses of metal secured to the inner face of the diaphragm 34 in alignment axially with each of the jaw blocks 52 so as to offset the centrifugal force of the jaw blocks 52 in operation which would otherwise tend to flex the diaphragm 34 in a direction to spring the jaws toward open position. Screws 54 or the equivalent are preferably not relied upon to maintain the jaw blocks 52 and counterweights 56 in fixed relation on the diaphragm 34, however, as preferably these parts are welded or brazed to the diaphragm in accordance with our copending application for Letters Patent of the United States for Improvements in Diaphragm Chuck, filed July 13, 1946, Serial No. 683,456.

Each jaw block 52 is provided with a radial bore 58 in which a pin 60 is axially slidably received. A cooperating adjusting screw 62 is threaded into the radially outer end of each bore 58 in abutting relationship with respect to the axially outer end of the corresponding pin 60 so that adjustment thereof in the bore 58 effects a corresponding adjustment of the pin 60 in such bore. Set screws 64 and 66 are provided for locking the pins 60 and adjusting screws 62, respectively, in their adjusted positions.

The radially inner ends of the pins 60 shown in Figs. 1 to 3, inclusive, are provided with frusto-conical ends 68 adapted to be received between the teeth of a cooperating gear such as 70 formed as part of a gear cluster, indicated in dotted lines generally at 72 and including a second gear such as 74. The taper of the ends 68 preferably being such as to contact such teeth on the pitch lines thereof.

It will be appreciated, of course, that in practice the pins 60 are radially adjusted so that when a gear cluster such as the cluster 72 is received in the chuck and the air pressure on the rear face of the piston 38 is relieved, the diaphragm 34 in tending to resume its normal position urges the inner ends 68 of the pins 60 radially inwardly with a sufficient force to firmly clamp the gear 70 between them in precisely concentric relation with respect to the axis of rotation of the chuck. It may be also noted at this point that by using conical points 68 such as those shown, gears with either helical or straight spur type of teeth may be chucked by the pins 60 without the necessity of adjusting the rotatable position of the pins 60 to correspond in each case.

Those skilled in the art will appreciate the fact that the jaw assemblies for the inner diaphragm 28 could be identical to those described for the outer diaphragm 34 and be correspondingly equally angularly spaced where a straight spur gear of such length that the teeth thereof can simultaneously engage the pins of both the inner and outer diaphragm chuck assemblies is to be chucked, or in a similar case, where a gear cluster having straight spur gears of the same number of teeth is to be chucked.

However, if a gear cluster having two spur gears thereon having a different number of teeth (the number of teeth on one not being a multiple of the teeth on the other) is to be chucked, and one of the gears is to be engaged by the jaw assemblies of the inner diaphragm and the other the jaw assemblies of the outer diaphragm, then a different condition is present. In such case if the pins of the jaw assemblies of the inner diaphragm are to be fixed circumferentially of the chuck they will have to be angularly spaced from one another so as to fit between the teeth of the cooperating gear according to the number of teeth on the gear, and the cluster will then only be capable of being introduced into the chuck in one rotatable position, or at most a very limited number of rotatable positions, with respect to the chuck. If a gear cluster including two gears is to be chucked, one gear by the jaw assemblies of each of the diaphragms, and the gears are of the helical type but of opposite hand, then it would be impossible to chuck it if the gear engaging pins of both diaphragms were fixed circumferentially with respect to the chuck.

To overcome the above described difficulty and to permit the chuck in question to chuck gear clusters having a pair of gears, each of a different number of teeth, in any rotatable position of the clusters with respect to the chuck, and likewise to permit gear clusters having helical teeth of different helix angle or helix angles of opposite hand to be chucked, the gear tooth engaging pins for the inner diaphragm 28 are so mounted as to permit them a material amount of bodily shiftable movement with respect to the diaphragm 28 about the axis of the chuck. This is accomplished in the following described manner.

Rotatably received within the pusher ring 46 is a pin mounting or carrier ring 76, the forward end of which is rotatably received and guided within the central opening 78 of the forward diaphragm 34 where it is sealed thereto by means of an O-ring seal 80. The pin carrying ring 76 is more or less cup-shaped in conformation and its rear end rotatably projects through the central opening 82 in the rear diaphragm 28, its end wall 84 lying substantially against the forward face of the piston 38 and being provided with a central hole or opening 86, the purpose of which will hereinafter be described.

The carrier ring 76 at equally angularly spaced points thereon corresponding with the number of jaw assemblies to be mounted on the inner diaphragm 28, in the case shown four, is provided approximately centrally of the length thereof with radially outwardly projecting bosses 88 and the pusher ring 46, as best brought out in Figs. 1 and 2, is notched or cut out from its axially inner face, as at 90, to a point axially in advance of the bosses 88 to permit the bosses 88 to project radially outwardly therethrough. Each boss 88 is provided with a radial bore 92 in which a pin 94 is axially slidably received, the pins 94 terminating at their radially inner end in a frusto-conical point 96 for engagement between the teeth of the gear to be chucked thereby, in the particular case shown, the teeth of the gear 74 of the cluster 72. The pins 94 are resiliently urged to a radially outer position by means of a split spring ring 98 lying in a plane perpendicular to the axis of the chuck and including the axes of the pins 94. The ring 98 projects through openings in the radially outer ends of pins 94 and is received in notches 100, as indicated in Fig. 1, formed circumferentially of the chuck in the outer ends of the bosses 88.

Located radially outwardly of the radially outer ends of the bosses 88 are jaw members 102 for the inner diaphragm 28. As previously stated, in the particular embodiment shown, there are four of these jaw members 102 arranged in equally angularly spaced relation about the axis of the chuck and each is secured to the forward face of the diaphragm 28 at the same radial distance from the axis of the chuck by dowel pins 104 and screws 106. However, and as explained in connection with the outer jaws 52, preferably this means is not relied upon to completely secure the jaw members 102 to the diaphragm 28 as preferably the dowels 104 are used to initially locate the jaw members 102 on the diaphragm 28 and screws 106 to secure them in place until such jaw members can be welded or brazed to the diaphragm 28.

Each jaw member 102 is centrally provided with a radial bore 108 in which is axially slidably received a pin member 110. An adjusting screw 112 is threadably received in the outer end of each bore 108 in abutting relation with respect to the radially outer end of the corresponding pin 110, and the pins 110 and screws 112 are releasably locked in adjusted position by means of setscrews 114 and 116, respectively. The pins 110 being cylindrical, the setscrews 114 serve to lock them both in axially and radially adjusted position in the openings 108. The setscrews 114 and 116 are of a socket end type and may be operated by inserting appropriate wrenches through aligned openings in the forward diaphragm 34 which are normally closed by screw plugs 118 and 120, respectively. The adjusting screws 112 are also of the socket end type and each is capable of being adjusted by inserting an appropriate wrench through an opening 122 formed in the ring member 30 in axial alignment therewith and normally closed by a screw plug 124.

Now as previously described, the carrier 76 for the tooth engaging pins 94 is mounted for relative rotation in the chuck so that the inner ends 96 of the pins 92 may be adjusted about the axis of the chuck when engaged by the teeth of an inner gear such as 74 of a gear cluster such as 72 to permit the inner ends or points 68 of the outer pins 60 to be properly received between the teeth of the outer gear 70 of such cluster. This so that no care need be exercised in inserting a gear cluster into the chuck to make sure that the gear cluster is in a predetermined rotatable position with respect to the chuck. For this reason, and in order to accommodate gear clusters having spur gears of different numbers of teeth, and to accommodate the greatest angle through which the ring carrier 76 must move to accommodate the same, the notches 90 in the pusher ring 46 through which the bosses 88 project must be wide enough to permit the carrier 76 to rotate through such angle. In this respect, it will be appreciated that rotation of the carrier 76 to accommodate the application of a gear cluster of the type described to the chuck must occur while the diaphragms are sprung outwardly to release the pins 60 and 94 and it is impossible to rotate the pusher ring 46 at such time due to the transmission of the force acting on the piston 38 therethrough, so that the notches 90 must be wide enough to permit such angular movement of the bosses 88 therebetween. It might be noted at this point that for other reasons that will hereinafter be more apparent, it is undesirable that the pusher ring 46 should rotate and in order to prevent such rotation and lock it in a predetermined rotatable position with respect to the chuck a pin 130, best shown in Figs. 1 and 3, is fixed in the pusher ring 46 and projects radially outwardly therefrom and such projecting end is slidably received in an axially directed groove 132 formed in the radially inner end of one of the counterweights 56.

Figure 5:
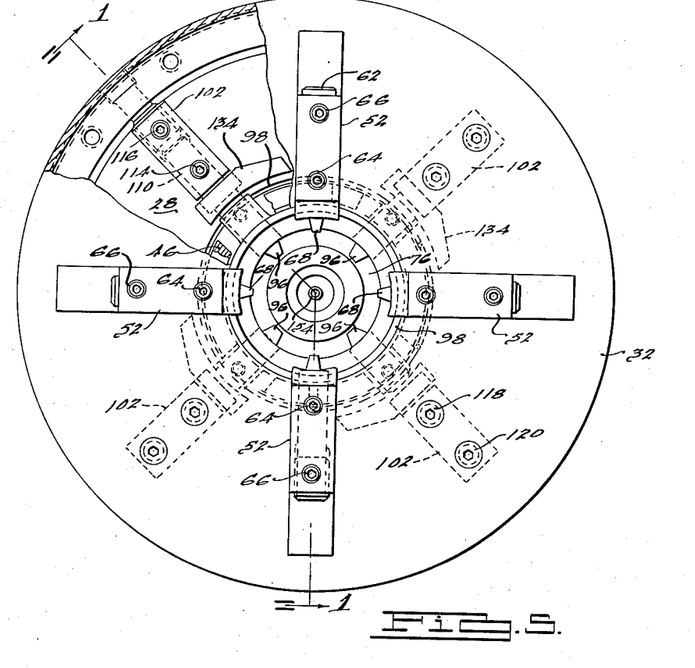
Fig. 5 is a partially broken face elevational view of the chuck shown in Fig. 1.

It will be appreciated that the pins 110 are axially aligned with the pins 94 only in one position of rotation of the carrier 76 and in order to enable the pins 110, when misaligned with the pins 94, to be effective in moving the pins 94 inwardly to engage between the teeth of the gear which is being chucked, the radially inner ends of the pins 110 are provided with extension pads 134 which, as best brought out in Fig. 5, project laterally therefrom and have an inner face for engaging the outer ends of the pins 110 curved approximately about the axis of the chuck. The extension pads 134 as illustrated in Fig. 5 project mainly in a clockwise direction from the pins 110, the extent of lateral projection of the pads 134 being sufficient to enable them to engage the outer ends of the pins 110 over the maximum rotational movement permitted for the carrier 76.

The described clearance of the bosses 88 in the notches 90 of the pusher ring 46 to accommodate the maximum conditions of relative rotational movement required between the carrier 76 and the chuck during chucking of substantially any conventional gear cluster having gears provided with straight teeth will ordinarily be found to be about 18° and, accordingly, if the width of the notches 90 permit this amount of movement of the bosses 88 therein it will be sufficient to adapt the chuck to receive substantially any such gear cluster of a size within the capacity of the chuck.

In chucking a gear cluster of the type last described, as for instance a gear cluster 72 illustrated in the drawings, and where such gear cluster is provided with straight spur teeth, the following procedure is followed. In this connection, it is to be noted that, as shown, in designing the chuck to fit a particular gear cluster, the pins 60 and 94 are axially spaced from one another by a distance smaller than the distance between the axially inner end of the teeth on the gear 70 from the axially inner end of the teeth on the gear 74 so that in inserting the gear, after the diaphragms have been sprung outwardly by the application of pressure to the rear face of the piston 38, the teeth of the gear 74 will engage the points 96 of the pins 94 prior to the time that the teeth of the gear 70 engage the point 68 of the pin 60. Under such circumstances and considering the chuck as having been opened by the application of pressure to the rear face of the piston 38, the gear cluster 72 is positioned with the smaller gear 74 at the inner end thereof. It is projected axially into the chuck in this position. The teeth of the gear 74 first engage the ends 96 of the pins 94 and the cluster is then turned until such points are received between the teeth of the gear 74, whereupon the entire cluster is turned in a clockwise direction until the bosses 88 strike and are stopped by the clockwise wall of the notches 90. The cluster is then moved inwardly until the teeth on the gear 70 strike the ends 68 of the pins 60, whereupon the cluster is turned in a counterclockwise direction until the space between the teeth of the gear 70 are aligned with the pin 66, and then the cluster is pushed entirely home in the chuck. The air pressure on the rear face of the piston 38 is then relieved so as to permit the diaphragms 28 and 34 to spring back towards their normal position whereby to cause the points 68 and 96 to securely grip the gear cluster 72 between them and with the pitch lines of the two gears 70 and 74 concentric with the axis of the chuck.

It will, of course, be appreciated that ordinarily and in accordance with conventional practice some means is preferably provided for limiting the depth to which the work may be projected into the chuck. The means shown in the drawing as illustrative of such a work stop comprises a ring 140 pressed into the bore of the carrier 76 against the end wall 84 thereof and against which the inner end of the cluster 72 is adapted to abut in order to locate the cluster 72 in a proper position axially of the chuck. The stop 140 is provided with a central opening 142 of greater diameter than the bore of the cluster 72 so as to provide for over-travel of a cutting tool in the bore of the cluster beyond the inner end thereof. The end wall 84 of the carrier 76 is provided with a plurality of holes 144 therethrough outwardly of the bore 142 providing knock-out holes for the stop 140 so as to permit the same to be driven out of the carrier 76 and replaced by another one of a different length when necessary or desirable.

Where gear clusters, such as the gear cluster 72, are to be chucked by the chuck described and the two gears thereof instead of having straight spur teeth have helical teeth either of the same or of opposite hand, then, of course, a somewhat different condition prevails for after the teeth of the inner gear are engaged with the points 96 of the pins 94 and the teeth of the outer gear first contact the points 68 of the pins 60; not only must the cluster be turned backwards in a counterclockwise direction of rotation to match the points 28 with the tooth spaces between the teeth of the outer gear 70 but, once they are aligned and the cluster is pressed inwardly, the engagement of the points 68 with the teeth of the gear 70 require rotation of the cluster in one direction and as the points 96 pass forwardly between the teeth of the rear gear 74 an added rotation in the same direction is also required. The maximum rotation of the carrier to accommodate the maximum helix angle of most conventional gear clusters having helical teeth of opposite hand and of a size within the capacity of the chuck will ordinarily be found not to exceed a required rotation of the carrier 76 of about 34° to accommodate the same, this, of course, being in addition to the 18° of rotation required of the carrier 76 to accommodate possible angular displacement of the teeth of the two gears simply because of the different number of teeth thereon. Accordingly, the notches 90 are made of a width, in order to accommodate the maximum conditions which may possibly be met within service, such as to permit a relative rotation of the carrier 76 in the chuck slightly in excess of the 18° plus the 34° or slightly in excess of the total of 52°, and the angular extent of the pads 134 are made to conform to this angle so that at all times they will be capable of transmitting the closing force of the diaphragm 28 to the pins 94.

It will therefore be appreciated from the foregoing that in accordance with the present invention a diaphragm chuck is provided including a pair of axially spaced diaphragms each provided with jaw mechanisms combining to simultaneously chuck two axially spaced gears of a gear cluster and in which the gear cluster may be inserted into the chuck without regard to the relative position of the cluster with respect to the chuck and this regardless of whether the gears of the gear cluster have straight spur teeth or helical teeth either of the same or of opposite hand. At the same time, the gear engaging elements of the chuck may be adjusted to accommodate gears of different diameters although, in some instances, the pins 94 for the rear diaphragm 28 may be required to be replaced with pins of different lengths to accommodate different gear clusters having inner gears of materially different diameters.

In the broader aspects of the invention, any suitable means may be provided for controlling the application of air pressure to the rear face of the piston 38 in order to expand the chuck for the release and/or insertion of work from or to the same. Likewise, and in accordance with conventional practice, any means may be provided for directing a blast of air into the interior of the carrier 76 to blow chips or other foreign material therefrom between chucking operations, this usually being desirable so as to eliminate the possibility of any such foreign material finding its way between the chucking pins and gear teeth so as to disturb the extremely accurate concentricity of the work which is ordinarily obtainable in these types of chucks. However, in accordance with the more limited phase of the present invention, a novel form of means is provided for the above described purposes.

Referring to the showing in the lower portion of Fig. 1, it will be noted that the pipe 40, which is threaded centrally into the backing plate 20, projects rearwardly therefrom through the bore of the spindle 24. The pipe 40 threadably receives on its rear end a connecting member 150 having a central bore 152 therein of a size equivalent to and aligned with the bore of the pipe 40. Concentrically located within the pipe 40 is a tube 154 of sufficiently smaller outside diameter than the bore of the pipe 40 to provide an annular passage 155 thereabout within the pipe 40. The forward or right-hand end of the tube 154 is closely but axially slidably received in a central opening or bore 156 in the piston 38 and its extreme end portion is received within the central bore 86 of the carrier 76 when the chuck is in its free position. The rear end of the tube 154 has a surrounding hollow member 158 fixed and sealed thereto which member 158 is closely received within the bore 152 of the member 150. The member 158 is provided with radially projecting and concentric annular flange 160 the forward or right-hand face of which lies in abutting relationship with respect to the left-hand end of the member 150.

A shaft 162 arranged in axial alignment with the aforementioned members is provided with a radially outwardly directed annular flange 164 at its forward or right-hand end which lies in abutting relationship with respect to the rear or left-hand end of the flange 160. A nut member 166 is provided with a small bore 168 at the rear or left-hand end thereof and a larger bore 170 communicating therewith and opening onto the right-hand end thereof, forming an annular shoulder 172 between them, the latter bore being threaded at its outer end and being threadably received upon the rear end of the member 150. The bore 170 is of a larger diameter than the diameter of the flanges 160 and 164 and the corresponding end of the member 150 so as to form an annular chamber 173 therebetween. The bore 168 is of a size to be press fitted upon the shaft 162 and is arranged thereon with the shoulder 172 in contacting relation with respect to the rear or left-hand axial face of the flange 164, as shown. The press fit between the nut member 166 and the shaft 162 is sufficient to provide an air tight joint, and a gasket 174 interposed between the right-hand end of the nut member 166 and the opposed shoulder formed on the member 150 serves to seal the joint therebetween against leaking. The member 150 is provided with radial openings 176 therein which connect the annular passage 155 with the annular chamber 173.

The shaft 162 is provided at one side of the axis thereof with an axially parallel bore or passage 178 which opens onto the forward or right-hand end of the shaft 162. The passage 178 is in constantly open communication with the left-hand recessed end of the member 158 and accordingly is in constant open communication with the interior of the tube 154. The shaft 162 is provided with a second axially parallel, but axially offset passage or bore 180 therein, but this passage terminates short of, or at least does not extend through, the flange 164 at the right-hand end of the shaft 162. The passage 180 is intended for constant open communication with the chamber 173 and to accomplish this result the bore 168 of the nut member 166 is provided with an annular channel 182 rearwardly or to the left of the flange 164, and one or more holes 184, as shown as three and brought out in Fig. 4, are drilled through the shoulder 172 in parallel relation with respect to the axis of the nut member 166 and into the channel 182. Thus, the passage 180 is placed in constant open communication with the chamber 173.

In order to introduce air separately into the passages 178 and 180, a conventional type of rotary slip coupling is employed. Briefly, this comprises a casing 186 having a bore in which the shaft 162 is closely, but rotatably received. The forward or right-hand end of the casing 186 abuts the left-hand end of the nut member 166, and one or more nuts 188 threaded on the rear or left-hand end of the shaft 162 in substantially abutting relationship with respect to the rear left-hand end of the casing 186 serves to maintain the casing in axial position on the shaft 162. It will of course be appreciated in this respect that the bore 180, which is drilled from the rear or left-hand end of the shaft 162, is plugged in the conventional manner. The casing 186 is provided with a pair of bosses 190 and 192, projecting radially therefrom provided with bores 194 and 196, respectively, each threaded for connection to a suitable air supply pipe 198 and 200, respectively. At the point where the bore 194 intersects the casing 186, the casing is provided with an annular groove 202 and, similarly, where the bore 196 intersects the bore of the casing 186 such bore of the casing is provided with an annular groove 204. The shaft 162 in transverse alignment with the groove 202 is provided with an opening 206 therein which communicates the passage 180 with the groove 202 thereby serving to continuously communicate the bore 194 with the passage 180. Similarly, the shaft 162 is provided with an opening 208 connecting the groove 204 with the passage 178.

From the above description, it will be appreciated that if air or other fluid under pressure is introduced through the pipe or pipe line 198 into the bore 194 it will flow through the opening 206 into the passage 180 thence into the groove 182 and through the openings 184 into the chamber 173, and thence through the openings 176 in the member 150 to the bore 152 of the latter, and thence through the annular passage 155 to the space between the forward face of the mounting plate 22 and the piston 38, thereby to urge the piston 38 to the right as viewed in Fig. 1 to spring the diaphragms 28 and 34 axially outwardly to move the respective jaw assembly toward the expanded position required for removing a piece of work from or introducing a piece of work to the chuck. It will also be appreciated that if air or other fluid under pressure is introduced into the bore 196 through the pipe or pipeline 200 it will flow through the groove 204 and opening 208 into the passage 178 and thence into the bore of the tube 154 and be discharged through the opening 86 of the carrier 76 and the central opening 142 of the stop member 140. This last flow provides a blast of air which will act to blow foreign material out of the central opening of the chuck, and off from the points 68 and 96 which directly engage the work during a chucking operation.

In connection with the last mentioned feature it will be appreciated that no seal is shown between the outer or right-hand end of the tube 154 and the bore 156 in the piston 38, and no such seal will be necessary where air is used to operate the piston 38 and also to blow out the bore of the chuck as in such case any leakage between the tube 154 and the piston 38 will simply add to the effects of the blast of air discharged from the tube 154. Furthermore, any leakage at this point will occur while the work is being loaded or unloaded inasmuch as this is the only time that fluid under pressure is applied to the rear face of the piston 38, and thus will occur only at the time that such blast of air is desired. However, if a liquid is employed to operate the piston 38, then it will be appreciated that a suitable seal will be required between the end of the tube 154 and the bore 156 in the piston 38 as ordinarily it would be undesirable to permit an escape of such liquid into the work receiving part of the chuck. In accordance with the above it will, of course, be assumed that in the present case air under pressure is employed to operate the piston 38.

As diagrammatically indicated in Fig. 1, in order to control the application of air under pressure to the rear face of the piston 38 a conventional manually operated three-way valve 210 is provided in the pipe line 198 so that the operator of the machine to which the chuck is applied may manually control the opening and closing of the chuck. The flow of air to blow out the bore of the chuck and introduced through the pipe line 200 may be similarly controlled, if desired, but in accordance with more limited phase of the invention it is preferably controlled in the following manner.

In Fig. 1, the base or frame of the machine tool to which the chuck of the present invention may be applied, and which for the purpose of illustration may be considered as an internal grinder, is indicated at 212, and the carriage which is reciprocably mounted thereon, and which carries the grinding wheel is indicated at 214. It will be understood that the base or frame 212 is stationary, and that the carriage or table 214 is adapted to reciprocate thereon in a direction parallel with the axis of the chuck already described and which is assumed such machine tool is equipped to chuck the work, in this case gear clusters, upon which a machining operation is to be performed. A two-way valve 216 connected in the pipe line 200 is mounted on the base or frame 212 in fixed relation with respect thereto, and is provided with an operating plunger 218. The valve 216 is of the conventional type when the operating plunger is constantly urged outwardly under spring pressure or the equivalent and when in such outward position is open to the flow of air under pressure therethrough, and when the plunger is depressed, it cuts off the flow of air under pressure through it. To operate the plunger 218 a cam 220 is fixed to the carriage or slide 214 and cam member 220 is so constructed and arranged that when overlying the plunger 218 it will depress it to permit the flow of air through the pipe line 200 to cause a blast of air to be admitted in the bore of the chuck, and when not in overlying relation with respect to the plunger 218 the plunger will be projected upwardly and will shut off the flow of air through the valve 216. In practice, the cam member 220 is so positioned in the length of the carriage or slide of the cooperating machine tool, here considered an internal grinder, that when the carriage or slide is moved to loading or unloading position, the cam 220 will be positioned rearwardly of the plunger 218 and release the latter to move to open position, and when the carriage or slide is moved to operating position will engage and depress the plunger 218 to prevent the flow of air through pipe line 200 as long as the machine is actually operating. With the above described arrangement it will be appreciated that when the machine is moved to loading or unloading position, a blast of air will be directed through the bore of the chuck, but this blast of air will be discontinued as soon as the tool of the machine, here considered a grinding wheel, is moved to working relation with respect to the work being operated upon, and that the control of the air for cleaning out the bore of the chuck is thereby automatically controlled.

Those skilled in the art will appreciate the fact that it is substantially impossible in mass production to consistently produce perfect gears, that is gears for instance in which the tooth spacing is unvarying throughout the entire periphery of the gear, or one for instance, in which each tooth is in absolute parallelism with the axis of the gear. Modern production methods approach such perfection, but unavoidably fall short thereof, ordinarily within small tolerated limits which do not materially detract from the desired operating characteristics thereof. However, any operations on such gears which introduce added inaccuracies are undesirable. In the present case, it will be appreciated that the pins 60 and 94 may be so located circumferentially of the chuck, in setting up a job, that they fit perfectly between the teeth of a perfectly formed gear; but it is unavoidable, where the pins are rigid and unyielding circumferentially of the chuck with respect to each other that if the spacing of the teeth of such gear between which these pins engage varies from that required for perfection, it will necessarily have an effect upon the desired concentric location of the gear in the chuck. Likewise, if the tooth space between a pair of teeth in which one of the pins is engaged varies from the exact parallelism to the axis of the gear a similar undesirable condition may result.

Figures 6, 7, 8, 9, 10, 11, 12, 13, 14:
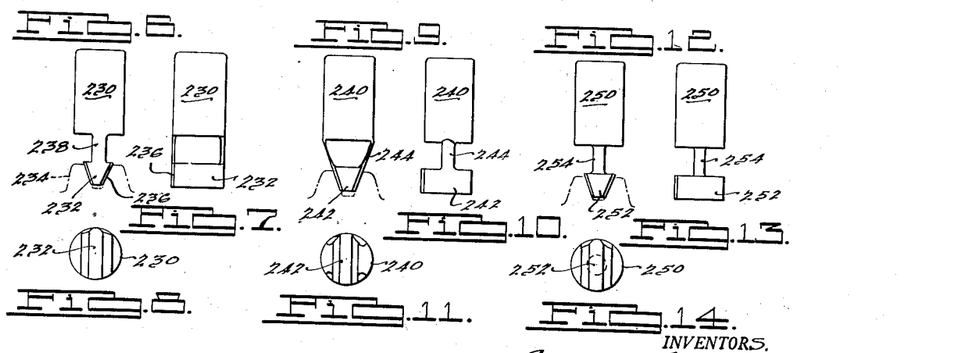

Now, in accordance with the first described difficulty, that is in tooth spacing, and in accordance with a more limited phase of the present invention, the effect of such error may be largely overcome by the use of the type of pins shown in Figs. 6, 7 and 8. It will be understood that the pins shown in these figures may be substituted for either or both the pins 60 and 94 previously described.

Referring to Figs. 7 and 8, the pin there shown comprises a cylindrical body portion 230 which, if it is to be employed to replace either the pins 60 or the pins 94, will be of the same diameter as such pins. While capable of employing a coned nose portion, such as the nose portions 68 and 96 of the previously described pins, the pin shown in Figs. 7 and 8 is provided with a point or nose portion 232 which is generally in the form of a rack tooth; that is, it is of a truncated wedge type. The opposite side faces of the nose portion 232 are disposed at an equal angle to the central axial plane including the axis of the pin 230 and at an included angle such as to bear against the teeth 234 of an associated gear, between a pair of which it is received, on the pitch line of the latter. To facilitate the entry of the point 232 between the teeth, such as the teeth 234 of a cooperating gear, the leading edges of the point 232 are preferably beveled as at 236.

It will be observed that the point 232 is connected to the body portion 230 by a neck portion 238, centrally disposed with respect to the axis of the pin 230 and parallel to the length of the point 232. The neck 238 may, of course, be readily formed by milling or otherwise machining away the material of the pin 230 on diametrically opposite sides immediately axially inwardly of the point 232. The amount of material left for the neck 238 is preferably such as to render the neck 238 rigid in a direction axially of the pin 230, but sufficient to render it laterally flexible, circumferentially of the associated chuck, to allow it to yield under the ordinary chucking pressure employed in the chuck. In other words with this construction, should any space between a pair of teeth between which the end 232 is received be slightly offset from its intended circumferential position on the gear with respect to the remaining tooth spaces between which the remaining ends of the chucking pins are to be received, the neck 238 of one or more of the pins 230 may yield laterally to accommodate such discrepancy and so as to permit accurate centering of the work gear without regard to such inaccuracy.

In Figs. 9, 10 and 11, a construction is shown which will overcome the second mentioned difficulty above described; that is, where the sides of the teeth are not in actual parallelism with the axis of the gear. In this case, the pins 240, which may be used to replace any of the pins heretofore described, are provided with a point 242, which may be identical to the point 232, connected to the main body 240 by means of a neck 244. In this case, however, a plane of thickness of the neck 244 extends at right angles to the length of the end 244 and is flexible or yieldable in such direction under the chucking force of the cooperating chuck so that the point 242 may tilt about an axis tangent to a circle concentric with the axis of the chuck to bring it into firm line contact with the sides of a pair of adjacent teeth between which it is received and which may not be absolutely parallel to the axis of the chuck.

In the construction illustrated in Figs. 12, 13 and 14, a pin construction is shown which includes the advantages of both pins showing Figs. 6–11 inclusive. In this case, the pin body 250 corresponds to the body 230 and 240 previously described, and the end 252 to the ends 232 and 242 respectively, and they may be identical thereto. The neck 254 in this case is a reduced cylindrical neck and therefore capable of yielding any lateral direction with respect to the axis of the pin. Consequently, this last construction may yield in any lateral direction required to offset any inaccuracy in the spacing or parallelism of the teeth of the gear to be chucked thereby.

These last described pin constructions will be appreciated as being illustrative of the broad invention in this respect, that of providing a pin having a rigid body and point, and a flexible neck therebetween, constantly maintaining the axial spacing of the point and body but permitting relative lateral displacement of one with respect to the other.

Having thus described our invention, what we claim by Letters Patent is:

1. In a diaphragm chuck, in combination, mounting means, a pair of axially spaced diaphragms supported by said mounting means, a plurality of jaw members carried by each of said diaphragms and spaced from each other angularly about the axis of said chuck, work engaging means operatively connected to and held in association with the diaphragms by said jaw members, each work-engaging means being shiftable between work disengaging and work engaging positions upon flexing of said diaphragms, and a common means for flexing both of said diaphragms.

2. In a diaphragm chuck, in combination, mounting means, a pair of axially spaced diaphragms supported by said mounting means, a plurality of jaw members carried by each of said diaphragms and spaced from each other angularly about the axis of said chuck, work engaging means carried by said jaw members on one of said diaphragms, work engaging means shiftable circumferentially of said chuck relative to the jaw members on the other of said diaphragms and radially actuatable thereby, and means for flexing said diaphragms.

3. In a diaphragm chuck, in combination, mounting means, a pair of axially spaced diaphragms supported by said mounting means, a plurality of jaw assemblies on each of said diaphragms and spaced from each other angularly about the axis of said chuck, a work engaging element associated with each jaw assembly carried by one of said diaphragms and releasably secured against movement with respect thereto, a work engaging member cooperatively associated with each jaw assembly carried by the other of said diaphragms and operable thereby between operative and inoperative position upon flexing of said other of said diaphragms, means mounting the last mentioned work engaging means for shiftable movement circumferentially of said chuck with respect to the last mentioned jaw members, and means for flexing said diaphragms.

4. In a diaphragm chuck, in combination, mounting means, a pair of axially spaced diaphragms secured at their peripheries against relative movement with respect to said mounting means, a plurality of work engaging members spaced angularly from one another about the axis of said chuck releasably secured against relative movement to one of said diaphragms, a plurality of work engaging members spaced axially of said chuck from the first mentioned work engaging members, means mounted for rotational movement about the axis of said chuck mounting the last mentioned work engaging members in angularly spaced relation with respect to each other about the axis of said chuck relative to the first mentioned work engaging members, means cooperating between the last mentioned work engaging members and the other of said diaphragms for causing interrelated movements thereof, and means for flexing said diaphragms.

5. In a diaphragm chuck in combination, mounting means, a pair of axially spaced diaphragms secured at their peripheries against relative movement with respect to said mounting means, a plurality of angularly spaced jaw assemblies fixed to one of said diaphragms, each of said jaw assemblies including work engaging means adapted for bodily movement therewith, carrier means rotatably associated with the other of said diaphragms, a plurality of work engaging means supported by said carrier means for movement radially of said chuck, means cooperating between said other of said diaphragms and said last mentioned work engaging means for effecting movement of the last mentioned work engaging means radially of said chuck upon flexing said other of said diaphragms axially of said chuck, and means for flexing said diaphragms.

6. In a diaphragm chuck, in combination, mounting means, a pair of axially spaced diaphragms fixed at their peripheries with respect to each other and to said mounting means, a plurality of angularly spaced jaw members fixed to one of said diaphragms, work engaging means carried by each of said jaw members, a carrier rotatably associated with the other of said diaphragms, a plurality of angularly spaced work engaging members slidably mounted in said carrier for movement radially of the axis of said chuck, and a like number of jaw assemblies fixed to said other diaphragm in angularly spaced relation with respect to each other about the axis of said chuck in overlying and cooperating relationship with respect to the last mentioned work engaging members, and means for simultaneously flexing said diaphragms.

7. In a diaphragm chuck, in combination, mounting means, a pair of axially spaced diaphragms fixed at their peripheries with respect to each other and to said mounting means, a plurality of angularly spaced jaw members fixed to one of said diaphragms, work engaging means carried by each of said jaw members, a carrier rotatably associated with the other of said diaphragms, a plurality of angularly spaced work engaging members slidably mounted in said carrier for movement radially of the axis of said chuck, and a like number of jaw assemblies fixed to said other diaphragm in angularly spaced relation with respect to each other about the axis of said chuck in overlying and coperating relationship with respect to the last mentioned work engaging members, means limiting the rotational movement of said carrier with respect to said other of said diaphragms, and means for simultaneously flexing said diaphragms.

8. In a diaphragm chuck, in combination, mounting means, a pair of axially spaced diaphragms fixed at their peripheries with respect to each other and to said mounting means, a plurality of angularly spaced jaw members fixed to one of said diaphragms, work engaging means carried by each of said jaw members, a carrier rotatably associated with the other of said diaphragms, a plurality of angularly spaced work engaging members slidably mounted in said carrier for movement radially of the axis of said chuck, and a like number of jaw assemblies fixed to said other diaphragm in angularly spaced relation with respect to each other about the axis of said chuck in overlying and cooperating relationship with respect to the last mentioned work engaging members, means constantly urging said work engaging members toward a radially outer position of movement, and means for simultaneously flexing said diaphragms.

9. In a diaphragm chuck, in combination, a mounting member, a pair of axially spaced diaphragms fixed at their peripheries with respect to each other and to said mounting members, a plurality of jaw members spaced angularly from each other about the axis of said chuck fixed to one of said diaphragms, a work engaging pin mounted for adjustment radially of the axis of said shaft in each of said jaw members, a carrier ring concentric with the axis of said chuck mounted adjacent the other of said diaphragms for movement relative thereto about the axis of said chuck, a plurality of work engaging pins spaced angularly from each other about the axis of said chuck mounted for movement radially of the axis of said chuck in said carrier ring, yieldable means constantly urging said pins in a radial outward direction, a plurality of jaw members fixed to said other of said diaphragms in spaced relation with respect to each other about the axis of said chuck, each in a position to engage the outer end of one of said second mentioned work engaging pins, and means to simultaneously flex said diaphragms.

10. In a diaphragm chuck, in combination, a mounting member, a pair of axially spaced diaphragms fixed at their peripheries with respect to each other and to said mounting members, a plurality of jaw assemblies spaced angularly from each other about the axis of said chuck fixed to one of said diaphragms, a work engaging pin mounted for adjustment radially of the axis of said chuck in each of said jaw assemblies, a carrier ring concentric with the axis of said chuck mounted adjacent the other of said diaphragms for movement relative thereto about the axis of said chuck, a plurality of work engaging pins spaced angularly from each other about the axis of said chuck mounted for movement radially of the axis of said chuck in said carrier ring, yieldable means constantly urging said pins in a radial outward direction, a plurality of jaw members fixed to said other of said diaphragms in spaced relation with respect to each other about the axis of said chuck, a pusher pin radially adjustably secured at each of the last mentioned jaw assemblies, the radially inner end of each of said pusher pins being extended circumferentially of said chuck and overlying the outer end of one of said second mentioned work engaging pins in any circumferentially shiftable position of the latter, and means for simultaneously flexing both of said diaphragms.

11. In a diaphragm chuck, in combination, mounting means including a cylinder forming member, a pair of diaphragms concentric therewith and axially spaced from one another fixed at their peripheries with respect to each other and to said mounting means, a plurality of jaw members arranged in spaced relation with respect to each other about the axis of said chuck fixed to each of said diaphragms, work engaging members carried by said jaw members fixed to one of said diaphragms and arranged to be moved between operative and inoperative positions upon flexing of said one diaphragm, a plurality of work engaging members associated with the other of said diaphragms, means operatively interconnecting the last mentioned work engaging means with said other of said diaphragms for interrelated movement therewith, a piston within said piston forming member, means spacing said piston from the central portions of both of said diaphragms, and means for applying fluid under pressure to the rear face of the piston whereby to cause said piston to axially flex both of said diaphragms.

12. In a diaphragm chuck, in combination, mounting means including a cylinder forming member, a pair of diaphragms concentric therewith and axially spaced from one another fixed at their peripheries with respect to each other and to said mounting means, a plurality of jaw members arranged in spaced relation with respect to each other about the axis of said chuck fixed to each of said diaphragms, work engaging members carried by said jaw members fixed to one of said diaphragms and arranged to be moved between operative and inoperative positions upon flexing of said one diaphragm, a plurality of work engaging members associated with the other of said diaphragms, means operatively interconnecting the last mentioned work engaging means with said other of said diaphragms for interrelated movement therewith, a piston within said piston forming member, means spacing said piston from the central portions of both of said diaphragms, means for applying fluid under pressure to the rear face of the piston whereby to cause said piston to axially flex both of said diaphragms, and means for projecting a blast of air through said piston into the space encompassed by all of said work engaging members.

13. In a diaphragm chuck, in combination, mounting means including a cylinder forming member, a pair of diaphragms concentric therewith and axially spaced from one another fixed at their peripheries with respect to each other and to said mounting means, a plurality of jaw members arranged in spaced relation with respect to each other about the axis of said chuck fixed to each of said diaphragms, work engaging members carried by said jaw members fixed to one of said diaphragms and arranged to be moved between operative and inoperative positions upon flexing of said one diaphragm, a plurality of work engaging members associated with the other of said diaphragms, means operatively interconnecting the last mentioned work engaging means with said other of said diaphragms for interrelated movement therewith, a piston within said piston forming member, means spacing said piston from the central portions of both of said diaphragms, means for applying fluid under pressure to the rear face of the piston whereby to cause said piston to axially flex both of said diaphragms, and means including a tube projecting through said piston for discharging a blast of air through said piston and into the space encompassed by all said work engaging members.

14. In a diaphragm chuck, in combination, mounting means including a cylinder forming member, a pair of diaphragms concentric therewith and axially spaced from one another fixed at their peripheries with respect to each other and to said mounting means, a plurality of jaw members arranged in spaced relation with respect to each other about the axis of said chuck fixed to each of said diaphragms, work engaging members carried by said jaw members fixed to one of said diaphragms and arranged to be moved between operative and inoperative positions upon flexing of said one diaphragm, a plurality of work engaging members associated with the other of said diaphragms, means operatively interconnecting the last mentioned work engaging means with said other of said diaphragms for interrelated movement therewith, a piston within said piston forming member, means spacing said piston from the central portions of both of said diaphragms, means for applying fluid under pressure to the rear face of the piston whereby to cause said piston to axially flex both of said diaphragms, and means including a tube projecting centrally through said piston and axially slidably associated therewith for directing a blast of air through said piston and through the space encompassed by said work engaging members forwardly thereof.

15. In a diaphragm chuck, in combination, mounting means including a cylinder forming member, a pair of diaphragms concentric therewith and axially spaced from one another fixed at their peripheries with respect to each other and to said mounting means, a plurality of jaw members arranged in spaced relation with respect to each other about the axis of said chuck fixed to each of said diaphragms, work engaging members carried by said jaw members fixed to one of said diaphragms and arranged to be moved between operative and inoperative positions upon flexing of said one diaphragm, a plurality of work engaging members associated with the other of said diaphragms, means operatively interconnecting the last mentioned work engaging means with said other of said diaphragms for interrelated movement therewith, a piston within said piston forming member, means spacing said piston from the central portions of both of said diaphragms, means for applying fluid under pressure to the rear face of the piston whereby to cause said piston to axially flex both of said diaphragms, means including a tube projecting centrally through said piston and axially slidably associated therewith for directing a blast of air through said piston and through the space encompassed by said work engaging members forwardly thereof, means for introducing a fluid under pressure to the rear face of said piston, and independent means for introducing a blast of air through air introducing means.

16. In combination with a machine tool having a base, a diaphragm chuck mounted for rotation thereon, a carriage slidable on said base in a direction parallel to the axis of said chuck, said chuck including fluid pressure operated means for flexing the diaphragm thereof and a tube projecting centrally through said fluid pressure operated means and opening into the bore of said chuck, a fluid pressure line connected to said fluid pressure operated means for supplying fluid under pressure thereto, an air line connected to said tube for supplying air therethrough, manually operable valvular means in the first mentioned line, and valvular means controlled by the slidable position of said carriage on said frame for controlling the flow of air through said air line.

17. In combination, a machine tool having a frame, a diaphragm chuck mounted for rotation on said frame, a carriage slidably mounted on said frame for movement parallel to the axis of said chuck, said diaphragm chuck including work engaging means, diaphragm means for moving said work engaging means between operative and inoperative positions, a piston and cylinder mechanism the piston of which is operatively connected to said diaphragm for effecting flexing thereof in one direction, means including a fluid pressure line operatively connected to said piston and cylinder assembly for applying fluid under pressure to one face of said piston to move it in a direction to flex said diaphragm, means including an air line projecting centrally through said piston from the rear face thereof and opening into the bore of said chuck for introducing a blast of air into said bore to blow foreign particles therefrom, manually operated valvular means in the first mentioned line for controlling the flow of fluid pressure therethrough, valvular means in said air line for controlling the flow of air therethrough, and means controlled by the slidable position of said carriage on said frame controlling the operation of the last mentioned valvular means.

18. In combination, a machine tool having a frame, a diaphragm chuck mounted for rotation on said frame, a carriage slidably mounted on said frame for movement parallel to the axis of said chuck, said diaphragm chuck including work engaging means, diaphragm means for moving said work engaging means between operative and inoperative positions, a piston and cylinder mechanism the piston of which is operatively connected to said diaphragm for effecting flexing thereof in one direction, means including a fluid pressure line operatively connected to said piston and cylinder assembly for applying fluid under pressure to one face of said piston to move it in a direction to flex said diaphragm, means including an air line projecting centrally through said piston from the rear face thereof and opening into the bore of said chuck for introducing a blast of air into said bore to blow foreign particles therefrom, manually operated valvular means in the first mentioned line for controlling the flow of fluid pressure therethrough, valvular means in said air line for controlling the flow of air therethrough, and means controlled by the slidable position of said carriage on said frame controlling the operation of the last mentioned valvular means, said lines including concentric tubes fixed for equal rotation with said chuck, a concentric shaft having axially spaced and independent fluid passages therein, means forming an open communication between one of said passages and the bore of the inner of said tubes, means providing open communication between the other of said passages and the space between the said tubes, and means rotatable with respect to said shaft providing a pair of passages in constant open communication, one with each of said passages in said shaft.

19. In a diaphragm chuck, in combination, a mounting member, a pair of axially spaced diaphragms fixed at their peripheries with respect to each other and to said mounting members, a plurality of jaw members spaced angularly from each other about the axis of said chuck fixed to one of said diaphragms, a work engaging pin mounted for adjustment radially of the axis of said shaft in each of said jaw members, a carrier ring concentric with the axis of said chuck mounted adjacent the other of said diaphragms for movement relative thereto about the axis of said chuck, a plurality of work engaging pins spaced angularly from each other about the axis of said chuck mounted for movement radially of the axis of said chuck in said carrier ring, yieldable means constantly urging said pins in a radial outward direction, a plurality of jaw members fixed to said other of said diaphragms in spaced relation with respect to each other about the axis of said chuck, each in a position to engage the outer end of one of said second mentioned work engaging pins, means to simultaneously flex said diaphragms, said work engaging pins each comprising a body portion, a head adapted for direct contact with the work, and a laterally flexible connection between said body portion and said head.

20. In a diaphragm chuck, mounting means, a pair of axially spaced diaphragms each having an outer marginal portion, means fastening the outer marginal portions only of said diaphragms to said mounting means, a plurality of jaw assemblies carried by each of said diaphragms and the jaw assemblies associated with each diaphragm being spaced angularly about the axis of said chuck and being shiftable between work-releasing and work-engaging positions upon flexing of said diaphragms, and a common means for simultaneously flexing both of said diaphragms.

21. In a diaphragm chuck, mounting means, a pair of axially spaced diaphragms each having an outer marginal portion and an inner marginal portion, means fastening the outer marginal portions only of said diaphragms to said mounting means, jaw assemblies carried by said diaphragms shiftable between work-releasing and work-engaging positions by flexure of said diaphragms, and means for applying pressure simultaneously against the inner marginal portions of said diaphragms to flex the latter.

22. A chucking element having a body portion and a terminal work-engaging portion connected by a flexible neck portion, said work-engaging portion and said neck portion each having a width dimensions and a thickness dimension and at least one dimension of said neck portion being less than the corresponding dimension of the work-engaging portion.

23. A chucking element having a body portion and a terminal work-engaging portion having generally the form of a rack tooth, said work-engaging portion being connected to said body portion by an integral, flexible neck portion, said work-engaging portion and said neck portion each having a width dimension and a thickness dimension and at least one dimension of said neck portion being less than the corresponding dimension of the work-engaging portion.

24. A chucking element having a body portion and a terminal rack-tooth portion connected by a neck portion, said neck portion being axially rigid but laterally flexible about a plane disposed transversely with respect to said rack-tooth portion and including said neck portion.

25. A chucking element having a body portion and a terminal rack-tooth portion connected by a neck portion, said neck portion being axially rigid but laterally flexible about a plane disposed longitudinally of said rack-tooth portion and including said neck portion.

26. A chucking element having a body portion and a terminal rack-tooth portion connected by a neck portion, said neck portion being axially rigid but laterally flexible in all directions.

GEORGE HOHWART.
ERNEST F. HOHWART.

REFERENCES CITED

The following references are of record in the file of this patent:

UNITED STATES PATENTS

| Number | Name | Date |
| --- | --- | --- |
| 400,459 | Ide | Apr. 2, 1889 |
| 926,761 | Oliver | July 6, 1909 |
| 1,036,994 | Garvin et al. | Aug. 27, 1912 |
| 1,056,954 | Sponable | Mar. 25, 1913 |
| 1,146,193 | Miller | July 13, 1915 |
| 1,565,227 | Garrison | Dec. 8, 1925 |
| 1,844,616 | Whiton | Feb. 9, 1932 |
| 1,858,693 | Van Norman | May 17, 1932 |
| 1,881,658 | Kelleher et al. | Oct. 11, 1932 |
| 2,394,624 | Matchett | Feb. 12, 1946 |
| 2,443,895 | Day et al. | June 22, 1948 |